United States Patent
Chen et al.

(10) Patent No.: US 11,726,570 B2
(45) Date of Patent: Aug. 15, 2023

(54) SURFACE CLASSIFICATIONS

(71) Applicant: Hewlett-Packard Development Company, L.P., Spring, TX (US)

(72) Inventors: Tai Hsiang Chen, Taipei (TW); Charles J. Stancil, Tomball, TX (US); Wei-Hung Lin, Taipei (TW); Kun-Hung Lin, Taipei (TW)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 17/476,077

(22) Filed: Sep. 15, 2021

(65) Prior Publication Data
US 2023/0077550 A1    Mar. 16, 2023

(51) Int. Cl.
*G06F 3/048* (2013.01)
*G06F 3/01* (2006.01)
*G06F 3/0354* (2013.01)
*G06F 3/041* (2006.01)
*G06N 3/02* (2006.01)
*G06F 3/038* (2013.01)

(52) U.S. Cl.
CPC ............ *G06F 3/016* (2013.01); *G06F 3/0383* (2013.01); *G06F 3/03546* (2013.01); *G06F 3/04162* (2019.05); *G06N 3/02* (2013.01); *G06F 3/048* (2013.01); *G06F 2203/0384* (2013.01)

(58) Field of Classification Search
None
See application file for complete search history.

(56) References Cited

U.S. PATENT DOCUMENTS

| | | |
|---|---|---|
| 9,710,064 B2 | 7/2017 | Grant |
| 2005/0248549 A1 | 11/2005 | Dietz |
| 2015/0212578 A1* | 7/2015 | Lor ............... G06F 3/03545 345/173 |
| 2017/0285774 A1* | 10/2017 | Parikh ............... G06F 3/167 |
| 2018/0253163 A1 | 9/2018 | Berger, Jr. |
| 2019/0043322 A1* | 2/2019 | Tachi ............... G06F 3/016 |
| 2019/0180097 A1* | 6/2019 | Ferguson ............ G06N 3/045 |
| 2021/0048285 A1* | 2/2021 | Lee ................... G01P 7/00 |

FOREIGN PATENT DOCUMENTS

CN              103020085 B      4/2013

* cited by examiner

*Primary Examiner* — Xuyang Xia
(74) *Attorney, Agent, or Firm* — Knobbe, Martens, Olson & Bear, LLP

(57) ABSTRACT

In some examples, an electronic device includes a tip pressure sensor to capture tip pressure data based on a writing surface. In some examples, the electronic device includes a processor to produce a classification of the writing surface based on the tip pressure data via a machine learning model. In some examples, the electronic device may include a haptic device to control haptic feedback based on the classification.

13 Claims, 5 Drawing Sheets

SURFACE CLASSIFICATIONS

BACKGROUND

Electronic technology has advanced to become virtually ubiquitous in society and has been used for many activities in society. For example, electronic devices are used to perform a variety of tasks, including work activities, communication, research, and entertainment. Different varieties of electronic circuitry may be utilized to provide different varieties of electronic technology.

DETAILED DESCRIPTION

Figure 1:
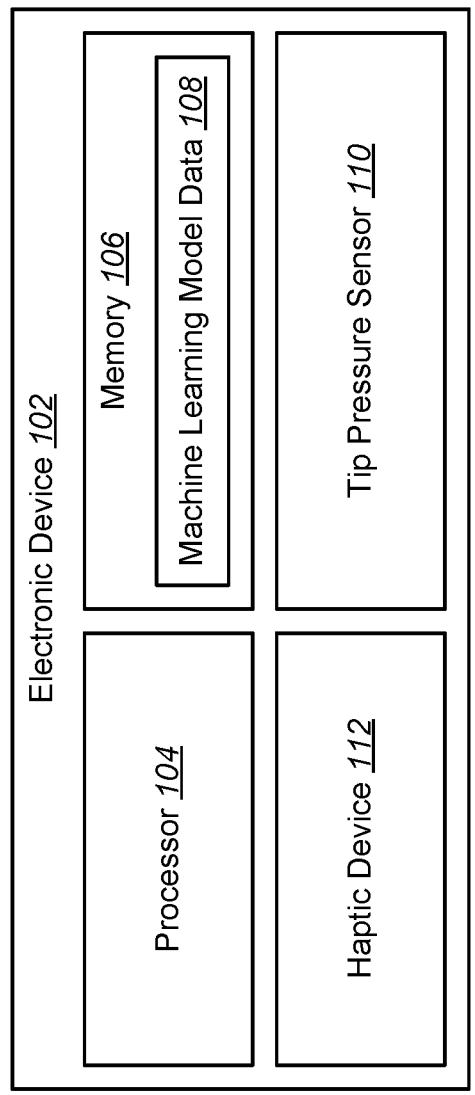
FIG. 1 is a block diagram illustrating an example of an electronic device for surface classification.

An electronic device is a device that includes electronic circuitry (e.g., integrated circuitry, etc.). Examples of electronic devices include stylus devices. A stylus device is an electronic device for writing or marking (e.g., an electronic writing utensil). In some examples, a stylus device may be utilized on a writing surface to electronically indicate writing or marking. A writing surface is a surface on which a stylus device may be utilized. Examples of writing surfaces include touchscreens, pressure-sensing surfaces, anti-glare screens, glass screens, plastic, wood, paper, glass, cloth, fabric, canvas, concrete, stone, walls, whiteboards, blackboards, etc. In some examples, movement of a stylus device may be sensed (e.g., tracked) by the stylus device, an apparatus, or a combination thereof to capture writing or marking. In some examples, contact between a stylus device and a writing surface may be sensed (e.g., tracked) by the stylus device, an apparatus, or a combination thereof to capture writing or marking.

In some scenarios, using a stylus device may be perceived as less natural than using a pencil or ball point pen. A pencil or pen may, when moved in contact with a writing surface, vibrate differently than a stylus device due to differences in writing surfaces (e.g., paper versus glass), differences in writing utensil structure, or a combination of both.

In some examples, a stylus device includes a haptic device. A haptic device is an electronic device (e.g., electromechanical device) capable of producing a haptic output (e.g., motion, vibration, force, tactile output, etc.). Examples of haptic devices include motors (e.g., weighted motors), actuators (e.g., linear resonant actuators), etc. In some examples, a haptic device includes a controller (e.g., microcontroller unit (MCU)) to perform logic operations, control operation, or a combination thereof. A stylus device includes a haptic device in some examples.

Some approaches to haptic output may operate without accounting for writing surface material or texture. For instance, some haptic devices may function similarly regardless of whether a stylus device is being used on a smooth surface (e.g., glass, non-textured plastic, whiteboard, etc.) or a textured surface (e.g., anti-glare screen, canvas, textured concrete, rough wood, etc.).

Some examples of the techniques described herein provide enhanced haptic output from a stylus device. For instance, some of the techniques provide haptic output control based on different writing surfaces. In some examples, haptic frequency, strength, or a combination thereof may be adjusted based on writing surface roughness, stylus device tip, or a combination thereof. For instance, some of the techniques may help to provide an enhanced (e.g., more regular) tactile writing experience while using a stylus device.

Some examples of the techniques described herein utilize machine learning. Machine learning is a technique where a machine learning model may be trained to perform a task based on a set of examples (e.g., data). Training a machine learning model may include determining weights corresponding to structures of the machine learning model. An artificial neural network is a kind of machine learning model that may be structured with nodes, layers, connections, or a combination thereof.

Examples of neural networks include multilayer perceptron (MLP) models, convolutional neural networks (CNNs) (e.g., CNN, deconvolutional neural network, inception module, residual neural network, etc.), and recurrent neural networks (RNNs) (e.g., RNN, multi-layer RNN, bi-directional RNN, fused RNN, clockwork RNN, etc.). Different neural network depths may be utilized in accordance with some examples of the techniques described herein.

Throughout the drawings, similar reference numbers may designate similar or identical elements. When an element is referred to without a reference number, this may refer to the element generally, without limitation to any particular drawing or figure. In some examples, the drawings are not to scale and the size of some parts may be exaggerated to more clearly illustrate the example shown. Moreover, the drawings provide examples in accordance with the description. However, the description is not limited to the examples provided in the drawings.

FIG. 1 is a block diagram illustrating an example of an electronic device 102 for surface classification. Examples of the electronic device 102 include stylus devices, active pens, active pencils, active styluses, digital pens, etc. In the example of FIG. 1, the electronic device 102 includes a processor 104, memory 106, tip pressure sensor 110, and haptic device 112. In some examples, components of the electronic device 102 may be coupled via an interface(s) (e.g., bus(es), wire(s), connector(s), etc.). In some examples, the electronic device 102 may be distinct from a passive stylus due to the active components included in the electronic device 102. The electronic device 102 may include additional components (not shown) or some of the components described herein may be removed or modified without departing from the scope of this disclosure.

The tip pressure sensor 110 is a pressure sensor that senses a degree of pressure (e.g., force, strain, etc.) exerted on a tip (not shown in FIG. 1) of the electronic device 102. Examples of pressure sensors include piezoelectric pressure sensors, optical pressure sensors, microelectromechanical machines (MEMS) pressure sensors, accelerometers, etc. For example, the tip pressure sensor 110 may be a transducer that converts a physical pressure (experienced by the tip) to an electrical signal (e.g., voltage amplitude, current amplitude, etc.). In some examples, the electrical signal may be sampled (e.g., discretized, periodically discretized). For instance, the electronic device 102, the tip pressure sensor 110, or a combination thereof may include an analog-to-digital converter (ADC) to convert an analog signal captured by the tip pressure sensor 110 to a digital signal.

The tip pressure sensor 110 captures tip pressure data based on a writing surface. For instance, the writing surface exerts pressure on the tip of the electronic device 102 when the tip is in contact with the writing surface. The pressure may vary as the tip moves on the writing surface. The tip pressure data represent the pressure(s) measured by the tip pressure sensor 110. For example, the data may represent voltage samples, current samples, pressure values, or a combination thereof over time.

The memory 106 is an electronic storage device, magnetic storage device, optical storage device, other physical storage device, or a combination thereof that contains or stores electronic information (e.g., instructions, data, or a combination thereof). In some examples, the memory 106 may be, for example, Random Access Memory (RAM), Electrically Erasable Programmable Read-Only Memory (EEPROM), a storage device, an optical disc, the like, or a combination thereof. In some examples, the memory 106 may be volatile or non-volatile memory, such as Dynamic Random Access Memory (DRAM), EEPROM, magnetoresistive random-access memory (MRAM), phase change RAM (PCRAM), memristor, flash memory, the like, or a combination thereof. In some examples, the memory 106 may be a non-transitory tangible machine-readable or computer-readable storage medium, where the term "non-transitory" does not encompass transitory propagating signals. In some examples, the memory 106 may include multiple devices (e.g., a RAM card and a solid-state drive (SSD)). In some examples, the memory 106 may be integrated into the processor 104. In some examples, the memory 106 includes (e.g., stores) machine learning model data 108. The machine learning model data 108 represents a machine learning model. For instance, the machine learning model data 108 may indicate node(s), layer(s), connection(s), weight(s), etc., of a machine learning model.

The processor 104 is electronic circuitry to perform arithmetic operations, logic operations, or a combination of both. In some examples, the processor 104 may be a semiconductor-based microprocessor, field-programmable gate array (FPGA), an application-specific integrated circuit (ASIC), central processing unit (CPU), graphics processing unit (GPU), other hardware device, or a combination thereof suitable for retrieval and execution of instructions stored in the memory 106. The processor 104 may execute instructions stored in the memory 106. In some examples, the processor 104 may include electronic circuitry that includes electronic components for performing an operation(s) described herein without the memory 106. In some examples, the processor 104 may perform one, some, or all of the aspects, operations, elements, etc., described in one, some, or all of FIG. 1-6. In some examples, the processor 104 may be artificial intelligence circuitry. In some examples, artificial intelligence circuitry may be circuitry to perform machine learning technique(s), learning technique(s), neural network technique(s), or a combination thereof.

The processor 104 produces a classification of the writing surface based on the tip pressure data via a machine learning model. In some examples, the processor 104 may receive the tip pressure data. For instance, the processor 104 receives the tip pressure data from the tip pressure sensor 110 over an internal bus (not shown in FIG. 2) of the electronic device 102.

The processor 104 produces the classification of the writing surface by executing the machine learning model using the tip pressure data as input. For instance, the processor 104 may produce the classification by executing the machine learning model represented by the machine learning model data 108, where the tip pressure data is input to the machine learning model.

A classification of a writing surface is a value, category, label, or combination thereof indicating an aspect of the writing surface. For example, the classification may indicate a surface type of the writing surface. A surface type is an indicator of a kind (e.g., material, category, etc.) of the writing surface. Examples of surface types include glossy touchscreen (e.g., touchscreen without anti-glare), anti-glare touchscreen, glass, whiteboard, blackboard, paper, wood, canvas, fabric, concrete, laminate, stone, etc.

In some examples, the classification indicates a roughness metric. A roughness metric is a value indicating a degree of roughness. For instance, the roughness metric may be a value on a numerical scale (e.g., 0-1, 0-10, 0-50, 1-100, etc.), where the numerical scale represents a range of roughness from approximately planar (e.g., 0 roughness) to a reference roughness (e.g., 2000 microinches of average roughness). As used herein, "average roughness" may refer to an average of absolute height values of a surface relative to a mean height of the surface. The numerical scale may represent a range of roughness with or without units (e.g., 0-50 micrometers (μm) of average roughness, 0-100%, etc.).

In some examples, the machine learning model is trained using training data labeled with a surface type. For example, tip pressure data may be captured (using a tip pressure sensor 110 of the electronic device 102 or another device) as training data and labeled according to surface type (e.g., glossy touchscreen, anti-glare touchscreen, glass, whiteboard, blackboard, paper, wood, canvas, fabric, concrete, laminate, stone, etc.). During a training stage, the training data is input to the machine learning model and the classification(s) of the machine learning model are evaluated using a loss function. The loss function is utilized to tune weights of the machine learning model to reduce loss (e.g., increase classification accuracy). During a prediction stage (e.g., after training), the machine learning model may be utilized to classify the writing surface according to surface type based on the tip pressure data. In some examples, similar training procedures may be followed where the training data is labeled with roughness metrics. During the prediction stage, the machine learning model may produce a classification of the writing surface with a roughness metric.

In some examples, the electronic device 102 may include a grip sensor (not shown in FIG. 2) to capture grip data. A grip sensor is a sensor that measures a degree of grip (e.g., contact, grip pressure, or a combination thereof). Examples of a grip sensor may include a pressure sensor, touch sensor, or a combination thereof. The grip sensor produces grip data indicating a degree of grip exerted on the electronic device 102 (e.g., stylus device) by a user. The processor 104 may produce the classification based on the grip data. For instance, the machine learning model may be trained using training grip data labeled with surface types, roughness metrics, or a combination thereof. During a prediction stage, the machine learning model may utilize the grip data (with tip pressure data, other data, or a combination thereof) to produce the classification.

In some examples, the electronic device 102 includes a communication interface(s) (not shown in FIG. 1). The electronic device 102 may utilize the communication interface(s) to communicate with an external device(s) (e.g., apparatus, tablet device, computing device, projector device, etc.). In some examples, the electronic device 102 may be in communication with (e.g., coupled to, have a communication link with) an apparatus. In some examples, the communication interface(s) may include a wireless interface (e.g., Bluetooth® interface, WI-FI® interface, etc.), wired interface (e.g., mobile industry processor interface (MIPI), Universal Serial Bus (USB) interface, etc.), or a combination thereof. In some examples, the communication interface(s) (e.g., MIPI, USB interface, etc.) may be coupled to the processor 104, to the memory 106, or a combination thereof.

In some examples, the communication interface may include hardware, machine-readable instructions, or a combination thereof to enable a component (e.g., processor 104, memory 106, etc.) of the electronic device 102 to communicate with the apparatus. In some examples, the communication interface may enable a wired connection, wireless connection, or a combination thereof to the apparatus. In some examples, the communication interface may include a network interface card, may include hardware, may include machine-readable instructions, or may include a combination thereof to enable the electronic device 102 to communicate with the apparatus.

In some examples, the apparatus may include orientation sensor(s), a writing surface (e.g., integrated display panel, touchscreen, pressure-sensitive pad, etc.), or a combination thereof that may be utilized to determine orientation data, coordinate data, speed data, or a combination thereof. Orientation data is data indicating an orientation of the electronic device 102 (e.g., stylus device). For example, the orientation data may indicate an azimuth angle, elevation angle, other orientation data, or a combination thereof. Coordinate data is data indicating a location of contact between the electronic device 102 (e.g., stylus device) and the apparatus. For example, the coordinate data may indicate where (in two-dimensional coordinates, for instance) a tip of the electronic device 102 contacts the apparatus (e.g., touchscreen, contact pad, etc.). Speed data is data indicating a movement speed of the electronic device 102. For instance, the speed data may indicate how quickly a tip of the electronic device 102 moves on the apparatus. In some examples, the apparatus may determine the speed data from coordinate data over time. The electronic device 102 may receive the orientation data, coordinate data, speed data, or a combination thereof from the apparatus via the communication interface(s). In some examples, the electronic device 102 may send data (e.g., tip pressure data) to the apparatus via the communication interface(s).

In some examples, the electronic device 102 (e.g., processor 104) may determine orientation data using orientation sensor(s) (not shown in FIG. 1) included in the electronic device 102 (with or without apparatus orientation data sent from the apparatus). For instance, the electronic device 102 may utilize information from integrated orientation sensor(s) as the orientation data, may receive orientation data from the apparatus, or may utilize a combination of electronic device 102 data and apparatus orientation data to determine the orientation data (e.g., relative angle(s) between the electronic device 102 and the apparatus).

In some examples, the processor 104 may produce the classification based on orientation data, coordinate data, speed data, or a combination thereof. In some examples, the orientation data, coordinate data, speed data, or a combination thereof may be received from an apparatus. The machine learning model may be trained using training orientation data, training coordinate data, training speed data, or a combination thereof labeled with surface types, roughness metrics, or a combination thereof. During a prediction stage, the machine learning model may utilize orientation data, coordinate data, speed data, or a combination thereof to produce the classification.

In some examples, the electronic device 102 may include an internal bus to communicate the classification from the processor 104 to the haptic device 112. Examples of an internal bus include an inter-integrated circuit (I2C) bus and a serial peripheral interface (SPI) bus.

The haptic device 112 controls haptic feedback based on the classification. Haptic feedback is a tactile output (e.g., motion, vibration, etc.) in response to an input (e.g., contact with a writing surface, tip pressure, etc.). In some examples, the haptic device 112 maps the classification to a haptic feedback model, haptic feedback amplitude, or a combination thereof. A haptic feedback model may indicate haptic feedback patterns depending on context. For instance, a haptic feedback model may indicate a first haptic feedback pattern for a tap, a second haptic feedback pattern for sliding contact, etc. A haptic feedback amplitude may indicate an intensity of the haptic feedback (e.g., vibration amplitude, actuator amplitude, etc.). The haptic device 112 may utilize a function or look-up table to map the classification to a haptic feedback model, haptic feedback amplitude, or a combination thereof. In some examples, the haptic device 112 may select a haptic feedback model, haptic feedback amplitude, or a combination thereof corresponding to a surface type indicated by the classification. For instance, smoother surface types may correspond to greater haptic feedback amplitudes and rougher surface types may correspond to lesser haptic feedback amplitudes. In some examples, the haptic device 112 may control haptic feedback with an inverse relationship relative to the roughness metric indicated by the classification. For instance, lesser roughness metrics may correspond to greater haptic feedback amplitudes and higher roughness metrics may correspond to lesser haptic feedback amplitudes.

In some examples, the haptic device 112 may control haptic feedback based on user setting data. User setting data is data indicating user settings for haptic feedback. For instance, the electronic device 102 may receive user setting data from an apparatus indicating a user setting(s) for a writing surface(s). For example, user setting data may indicate that a user selected lesser haptic feedback amplitude or a non-default haptic feedback model for touchscreen surfaces, for surfaces with less than a roughness metric, or a combination thereof. In some examples, the haptic device 112 may map the classification (e.g., surface type, roughness metric, or a combination thereof) to a setting indicated by the user setting data. The haptic device 112 may control the haptic feedback as indicated by the user setting data.

Figure 3:
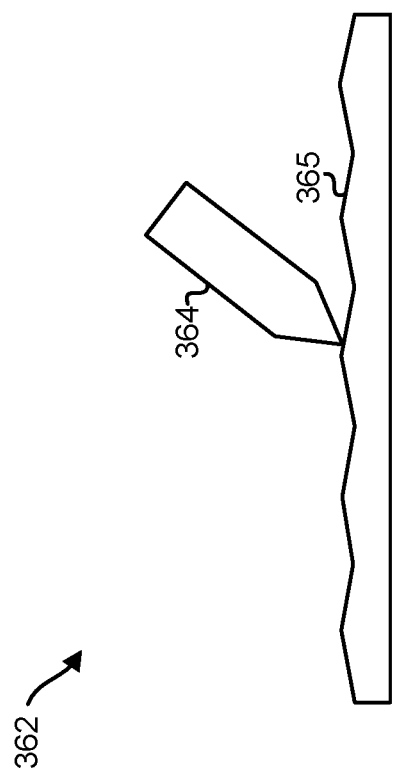
FIG. 3 is a diagram illustrating an example of a second scenario where a second stylus device is used on a second surface in accordance with some of the techniques described herein.
Figure 2:
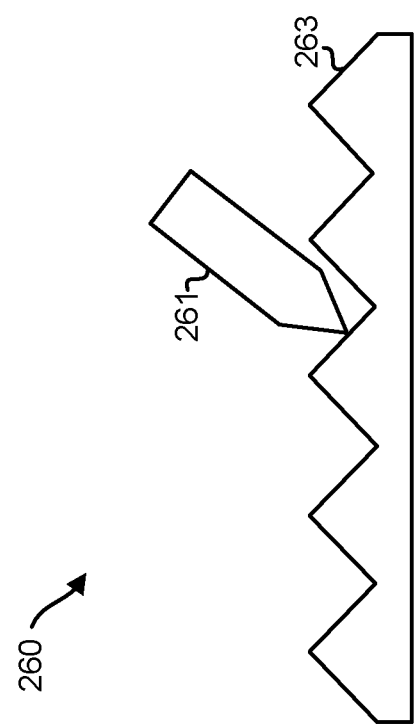
FIG. 2 is a diagram illustrating an example of a first scenario where a first stylus device is used on a first surface in accordance with some of the techniques described herein.

FIG. 2 is a diagram illustrating an example of a first scenario 260 where a first stylus device 261 is used on a first surface 263 in accordance with some of the techniques described herein. FIG. 3 is a diagram illustrating an example of a second scenario 362 where a second stylus device 364 is used on a second surface 365 in accordance with some of the techniques described herein. FIG. 2 and FIG. 3 are described together.

The first stylus device 261 may be an example of the electronic device 102 described in FIG. 1. In this example, the first stylus device 261 captures tip pressure data using a tip pressure sensor as the first stylus device 261 is used on the first surface 263. The first stylus device 261 uses the tip pressure data to classify the first surface 263. For instance, the first stylus device 261 may execute a machine learning model to classify the first surface 263 as a relatively rougher surface (e.g., anti-glare touchscreen, canvas, etc.). The first stylus device 261 uses the classification to control haptic feedback. For instance, the first stylus device 261 may include a haptic device. The haptic device may select haptic feedback (e.g., a haptic feedback model, a haptic feedback amplitude, or a combination thereof) that provides relatively less haptic feedback.

The second stylus device 364 may be an example of the electronic device 102 described in FIG. 1. In this example, the second stylus device 364 captures tip pressure data using a tip pressure sensor as the second stylus device 364 is used on the second surface 365. The second stylus device 364 uses the tip pressure data to classify the second surface 365. For instance, the second stylus device 364 may execute a machine learning model to classify the second surface 365 as a relatively smoother surface (e.g., glossy touchscreen, glass, etc.). The second stylus device 364 uses the classification to control haptic feedback. For instance, the second stylus device 364 may include a haptic device. The haptic device may select haptic feedback (e.g., a haptic feedback model, a haptic feedback amplitude, or a combination thereof) that provides relatively increased haptic feedback.

Figure 4:
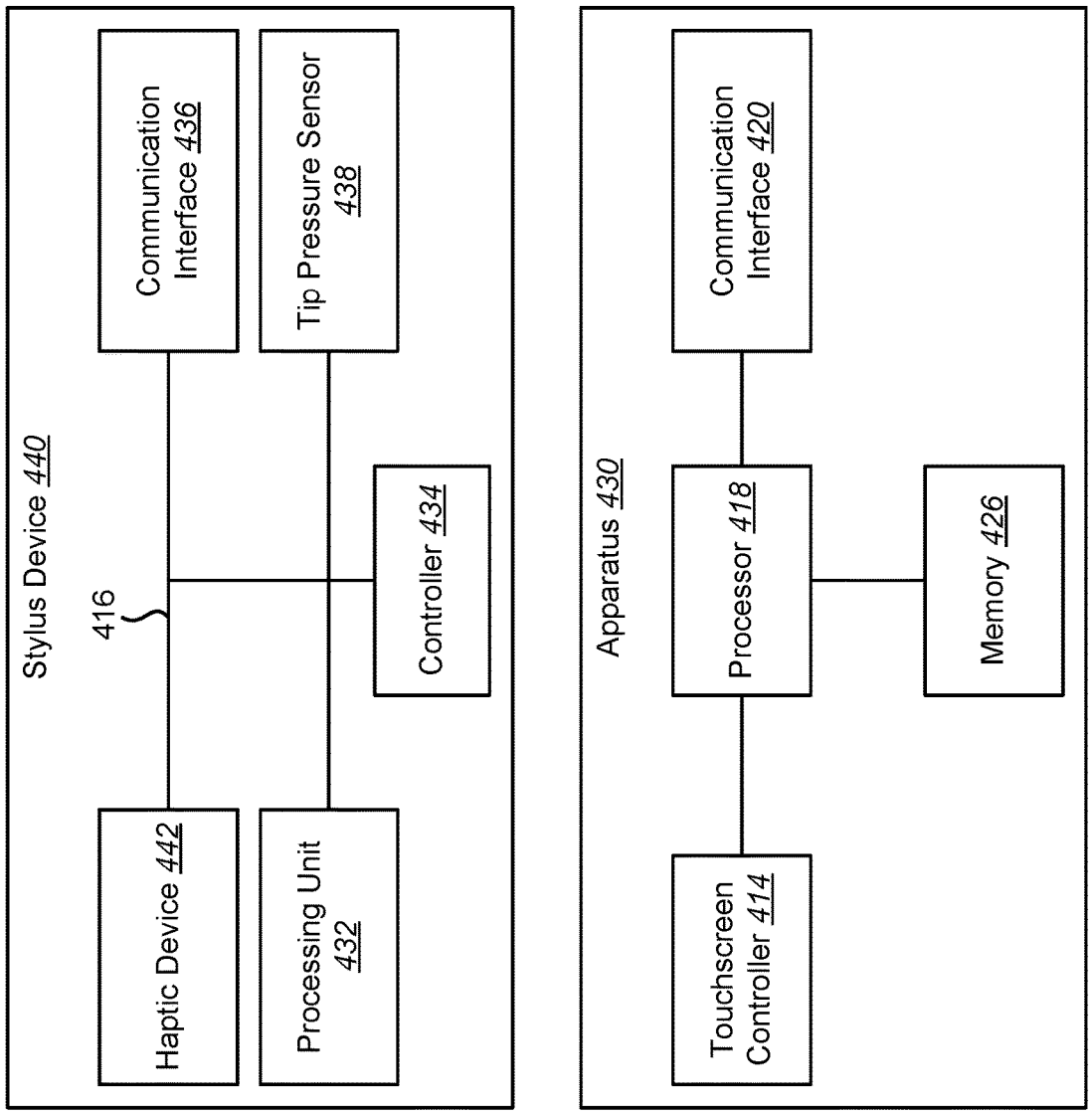
FIG. 4 is a block diagram illustrating an example of an apparatus for surface classifications and an example of a stylus device for surface classifications.

FIG. 4 is a block diagram illustrating an example of an apparatus 430 for surface classifications and an example of a stylus device 440 for surface classifications. In some examples, the apparatus 430, the stylus device 440, or a combination thereof may perform an aspect(s) of the operations described in FIG. 1, FIG. 2, FIG. 3, or a combination thereof. In some examples, the stylus device 440 may be an example of the electronic device 102 described in FIG. 1 and the apparatus 430 may be an example of the apparatus described above.

In the example illustrated in FIG. 4, the stylus device 440 includes a haptic device 442, a processing unit 432, a controller 434, a communication interface 436, a tip pressure sensor 438, and an internal bus 416. The haptic device 442 is an example of the haptic device 112 described in FIG. 1. The processing unit 432 is an example of the processor 104 described in FIG. 1. In some examples, the processing unit 432 may be an accelerated processing unit (APU), a tensor processing unit (TPU), or a combination thereof. In some examples, the processing unit 432 may execute a machine learning model as described in FIG. 1 to produce a classification (based on tip pressure data from the tip pressure sensor 438, for instance).

The controller 434 is electronic circuitry to control operations of the stylus device 440. For instance, the controller 434 may coordinate operations between various components of the stylus device 440. In some examples, the stylus device 440 may include an additional component(s) (not shown in FIG. 4). For example, the stylus device 440 may include a battery, a charger integrated circuit, a switch, etc. In some examples, a component(s) shown in FIG. 4 may be omitted from the stylus device 440.

In some examples, the internal bus 416 may be an example of the internal bus described in FIG. 1. For instance, the internal bus 416 may communicate a classification from the processing unit 432 to the haptic device 442 in some examples.

The tip pressure sensor 438 is an example of the tip pressure sensor 110 described in FIG. 1. The communication interface 436 is an example of the communication interface described in FIG. 1. For instance, the communication interface 436 may enable the stylus device 440 to communicate with the apparatus 430 using a wireless (e.g., Bluetooth) or wired link. In some examples, the communication interface 436 may send tip pressure data (from the tip pressure sensor 438) to the apparatus 430.

In the example illustrated in FIG. 4, the apparatus 430 includes a touchscreen controller 414, processor 418, memory 426, and a communication interface 420. Examples of the apparatus 430 may include a computing device, smartphone, laptop computer, tablet device, mobile device, television, etc.). In some examples, one, some, or all of the components of the apparatus 430 may be structured in hardware or circuitry. In some examples, the apparatus 430 may perform one, some, or all of the operations described in FIG. 1-6.

The communication interface 420 is a wireless communication interface, a wireless communication interface, or a combination of both. In some examples, the communication interface 420 receives tip pressure data from the stylus device 440.

The touchscreen controller 414 is circuitry to control touchscreen operation. For example, the apparatus 430 may include a touchscreen (not shown in FIG. 4). The touchscreen controller 414 may detect contact with the touchscreen, interaction with the touchscreen, or a combination thereof. For example, the touchscreen controller 414 may detect contact between the stylus device 440 and the touchscreen.

In some examples, the touchscreen controller 414 determines information, including coordinate data, orientation data, speed data, or a combination thereof corresponding to the stylus device 440. For instance, the touchscreen controller 414 may detect coordinates of a point of contact (with the stylus device 440 tip, for example) on the touchscreen by detecting a capacitance change, electromagnetic field, light change, pressure, or a combination thereof. In some examples, the touchscreen controller 414 may determine speed data by tracking coordinates of a point of contact over time. For instance, the touchscreen controller 414 may determine a distance moved by the stylus device 440 tip over a period of time (e.g., a spatial difference in locations of a point of contact at two times divided by a difference of the two times).

In some examples, the touchscreen controller 414 may determine the orientation data by receiving stylus device 440 orientation data via touchscreen communication. For instance, the stylus device 440 may include an orientation sensor(s) (e.g., tilt sensor(s), gyro sensor(s), accelerometer(s), etc.) that produce(s) stylus device 440 orientation data. The stylus device 440 may transfer the stylus device 440 orientation data via touchscreen communication to the touchscreen controller 414. The apparatus 430 may utilize the stylus device 440 orientation data as the orientation data or may utilize the stylus device 440 orientation data in combination with apparatus 430 orientation data to produce the orientation data. In some examples, the apparatus 430 may include an orientation sensor(s) (e.g., tilt sensor(s), gyro sensor(s), accelerometer(s), etc.) that produce(s) apparatus 430 orientation data. The apparatus 430 (e.g., touchscreen controller 414, processor 418, etc.) may utilize the stylus device 440 orientation data with the apparatus 430 orientation data to determine the orientation data (e.g., relative angle(s) between the stylus device 440 and the apparatus 430). For instance, the apparatus may utilize the stylus device 440 orientation data (from the orientation sensor(s) in the stylus device 440) and the apparatus 430 orientation data (from the orientation sensor(s) in the apparatus 430) to determine the relative angle(s) (e.g., stylus device 440 angle(s) relative to a touchscreen of the apparatus 430). For instance, the stylus device 440 orientation data and the apparatus 430 orientation data may be utilized to determine relative angle(s) (e.g., elevation angle of the stylus device 440 relative to the touchscreen, difference vector, azimuth angle of the stylus device 440 relative to the touchscreen, etc.). In some examples, the stylus device 440 orientation data may be communicated to the apparatus 430 via the communication interface 436 on the stylus device 440 and the communication interface 420 on the apparatus 430 (e.g., via Bluetooth, WI-FI, or another communication interface).

In some examples, the stylus device 440 may determine the orientation data (e.g., tilt angle, elevation angle, azimuth angle, or a combination thereof). For instance, the stylus device 440 may utilize orientation sensor(s) to determine stylus device 440 orientation data, which may be utilized as the orientation data. In some examples, the stylus device 440 may receive apparatus 430 orientation data sent from the apparatus 430 to determine the orientation data (e.g., relative angle(s) between the stylus device 440 and the apparatus 430, difference vector, elevation angle, azimuth angle, etc.).

The memory 426 is an electronic storage device, magnetic storage device, optical storage device, other physical storage device, or a combination thereof that contains or stores electronic information (e.g., instructions, data, or a combination thereof). In some examples, the memory 426 may be, for example, RAM, EEPROM, a storage device, an optical disc, the like, or a combination thereof. In some examples, the memory 426 may be volatile or non-volatile memory, such as DRAM, EEPROM, MRAM, PCRAM, memristor, flash memory, the like, or a combination thereof. In some examples, the memory 426 may be a non-transitory tangible machine-readable or computer-readable storage medium. In some examples, the memory 426 may include multiple devices (e.g., a RAM card and an SSD). In some examples, the memory 426 may be integrated into the processor 418. In some examples, the memory 426 includes (e.g., stores) machine learning model data. The machine learning model data represents a machine learning model. For instance, the machine learning model data may indicate node(s), layer(s), connection(s), weight(s), etc., of a machine learning model. In some examples, the machine learning model may be an MLP model.

The processor 418 is electronic circuitry to perform arithmetic operations, logic operations, or a combination of both. In some examples, the processor 418 may be a semiconductor-based microprocessor, FPGA, an ASIC, CPU, GPU, other hardware device, or a combination thereof suitable for retrieval and execution of instructions stored in the memory 426. The processor 418 may execute instructions stored in the memory 426. In some examples, the processor 418 may include electronic circuitry that includes electronic components for performing an operation(s) described herein without the memory 426. In some examples, the processor 418 may perform one, some, or all of the aspects, operations, elements, etc., described in one, some, or all of FIG. 1-6. In some examples, the processor 418 may be artificial intelligence circuitry. In some examples, artificial intelligence circuitry may be circuitry to perform machine learning technique(s), learning technique(s), neural network technique(s), or a combination thereof.

The processor 418 may produce a writing surface classification using a machine learning model based on the tip pressure data and the information. For instance, the processor 418 may utilize tip pressure data from the stylus device 440 and information (e.g., coordinate data, orientation data, speed data, or a combination thereof) to produce a writing surface classification using a machine learning model. In some examples, the machine learning model is stored in the memory 426. In some examples, the machine learning model may be trained to produce a writing surface classification based on tip pressure data, coordinate data, orientation data, speed data, or a combination thereof as similarly described in FIG. 1.

In some examples, the communication interface 420 may send the writing surface classification to the stylus device 440. In some examples, the stylus device 440 may provide the writing surface classification to the haptic device 442 to control haptic feedback as described in FIG. 1.

Figure 5:
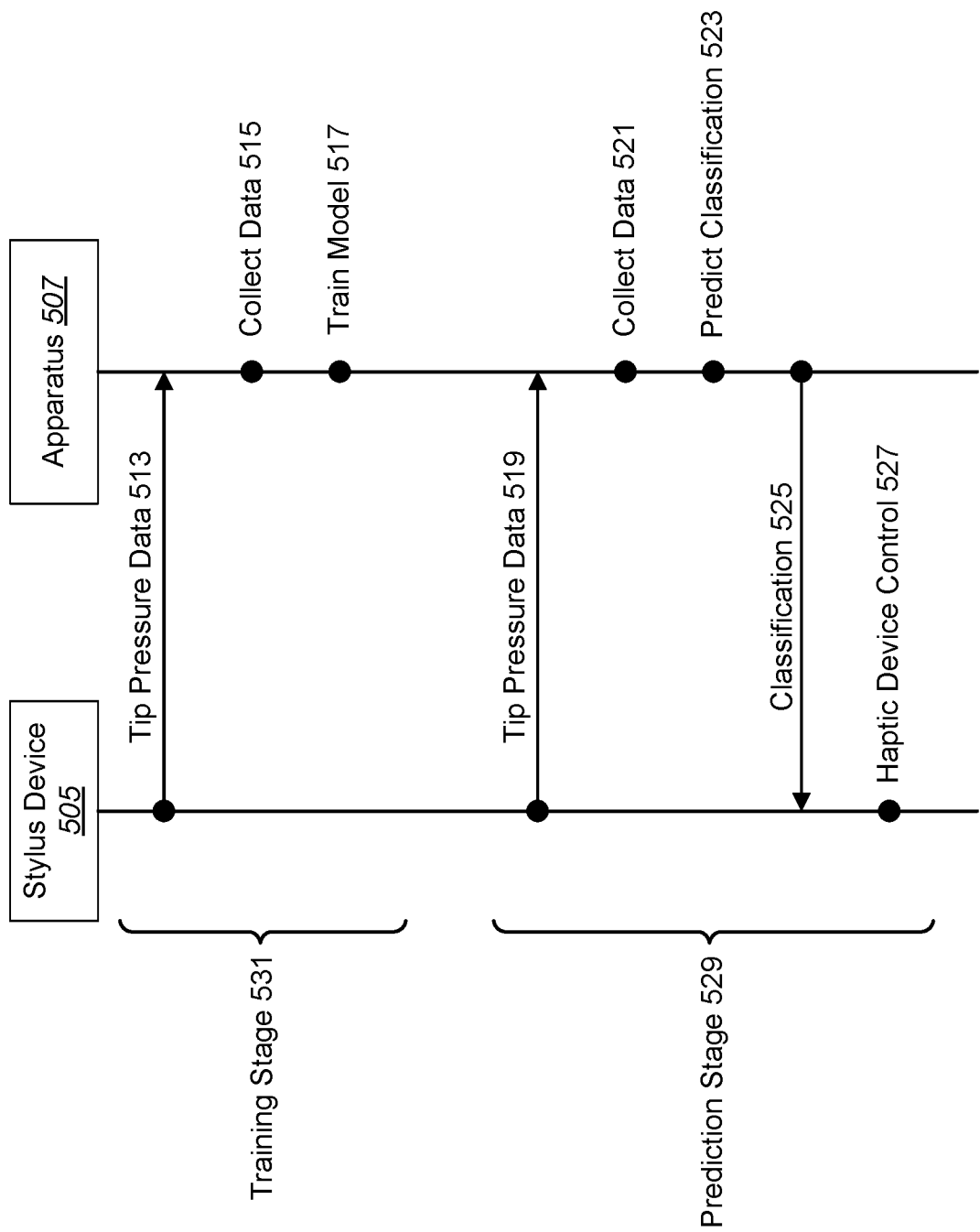
FIG. 5 is a thread diagram illustrating an example of a training stage and a prediction stage for a stylus device and an apparatus.

FIG. 5 is a thread diagram illustrating an example of a training stage 531 and a prediction stage 529 for a stylus device 505 and an apparatus 507. FIG. 5 illustrates examples of a stylus device 505 and an apparatus 507. In some examples, the stylus device 505 and the apparatus 507 are respective examples of the stylus device 440 and the apparatus 430 described in FIG. 4. The stylus device 505 and the apparatus 507 may communicate (e.g., send data, receive data, or a combination of both) using wireless communication interfaces, wired communication interfaces, or a combination thereof.

A training stage 531 may include data collection, model training, or a combination thereof. At 513, the stylus device 505 sends captured tip pressure data to the apparatus 507. The tip pressure data may correspond to a period(s) in which the stylus device 505 was in contact with a writing surface.

At 515, the apparatus 507 collects data. For example, the apparatus 507 may collect coordinate data, orientation data, speed data, or a combination thereof. For instance, the apparatus 507 may obtain information as described in FIG. 4.

At 517, the apparatus 507 may train a machine learning model. In some examples, training the machine learning model may be performed as described in FIG. 1. For example, the apparatus 507 may input the tip pressure data, coordinate data, orientation data, speed data, or a combination thereof to a machine learning model. The machine learning model may produce a classification of the writing surface. The apparatus 507 may adjust weight(s), a hyperplane(s), or combinations thereof to reduce classification error.

A prediction stage 529 may include data collection, classification prediction, haptic device control, or a combination thereof. At 519, the stylus device 505 sends captured tip pressure data (e.g., newly captured tip pressure data) to the apparatus 507. The tip pressure data may correspond to a subsequent period(s) after the training stage 531 in which the stylus device 505 was in contact with a writing surface.

At 521, the apparatus 507 collects data. For example, the apparatus 507 may collect coordinate data, orientation data, speed data, or a combination thereof after the training stage 531. For instance, the apparatus 507 may obtain information as described in FIG. 4.

At 523, the apparatus 507 may predict a classification. In some examples, predicting a classification may be performed as described in FIG. 1. For example, the apparatus 507 may input the tip pressure data, coordinate data, orientation data, speed data, or a combination thereof to a machine learning model. The machine learning model may predict the classification of the writing surface.

At 525, the apparatus 507 sends the classification to the stylus device 505. At 527, the stylus device 505 uses the classification to perform haptic device control.

Figure 6:
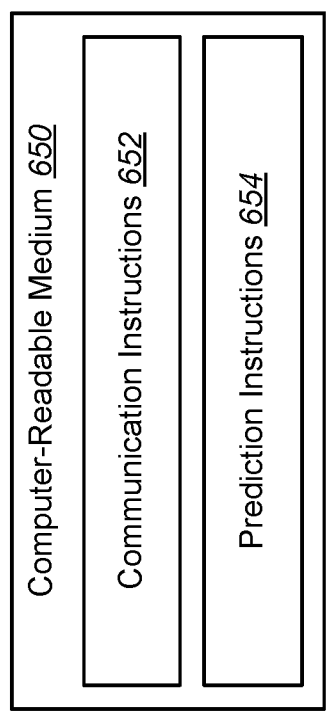
FIG. 6 is a block diagram illustrating an example of a computer-readable medium for surface classifications.

FIG. 6 is a block diagram illustrating an example of a computer-readable medium 650 for surface classifications. The computer-readable medium 650 is a non-transitory, tangible computer-readable medium. In some examples, the computer-readable medium 650 may be, for example, RAM, DRAM, EEPROM, MRAM, PCRAM, a storage device, an optical disc, the like, or a combination thereof. In some examples, the computer-readable medium 650 may be volatile memory, non-volatile memory, or a combination thereof. In some examples, the computer-readable medium 650 described in FIG. 6 may be an example of the memory 106 described in FIG. 1 or the memory 426 described in FIG. 4.

The computer-readable medium 650 may include data (e.g., information, instructions). In the example of FIG. 6, the computer-readable medium 650 includes communication instructions 652 and prediction instructions 654.

The communication instructions 652 may include instructions when executed cause a processor of an electronic device to receive tip pressure data captured by a tip pressure sensor. The tip pressure data may be captured while a stylus tip is in contact with a writing surface. In some examples, receiving tip pressure data may be performed as described in FIG. 1, FIG. 2, FIG. 3, FIG. 4, FIG. 5, or a combination thereof.

The prediction instructions 654 may include instructions when executed cause the processor to predict, using a machine learning model, a classification of the writing surface based on the tip pressure data. In some examples, predicting the classification may be performed as described in FIG. 1, FIG. 2, FIG. 3, FIG. 4, FIG. 5, or a combination thereof.

The communication instructions 652 may include instructions when executed cause a processor of an electronic device to send the classification to a haptic device. In some examples, sending the classification may be performed as described in FIG. 1, FIG. 2, FIG. 3, FIG. 4, FIG. 5, or a combination thereof. In some examples, the classification is sent to a haptic device via a wireless communication interface. In some examples, the classification is sent to a haptic device via an internal bus.

As used herein, items described with the term "or a combination thereof" may mean an item or items. For example, the phrase "A, B, C, or a combination thereof" may mean any of: A (without B and C), B (without A and C), C (without A and B), A and B (without C), B and C (without A), A and C (without B), or all of A, B, and C.

While various examples are described herein, the described techniques are not limited to the examples. Variations of the examples are within the scope of the disclosure. For example, operation(s), aspect(s), or element(s) of the examples described herein may be omitted or combined.

What is claimed is:

1. An electronic device, comprising:
a tip pressure sensor to capture tip pressure data based on a writing surface;
a processor to produce, during a prediction stage, a classification of the writing surface based on the tip pressure data via a machine learning model, the classification of the writing surface including a value indicating a degree of roughness of the writing surface, the machine learning model having weights tuned, during a training stage, to produce the classification of the writing surface, wherein the machine learning model is an artificial neural network; and
a haptic device to control haptic feedback based on the classification,
wherein the haptic device is to control haptic feedback with an inverse relationship relative to the value indicating the degree of roughness of the writing surface.

2. The electronic device of claim 1, wherein the classification indicates a surface type of the writing surface.

3. The electronic device of claim 1, wherein the machine learning model is trained using training data labeled with a surface type.

4. The electronic device of claim 1, further comprising an internal bus to communicate the classification from the processor to the haptic device.

5. The electronic device of claim 1, wherein the haptic device is to control haptic feedback further based on user setting data.

6. The electronic device of claim 1, further comprising a grip sensor to capture grip data, wherein the processor is to produce the classification based on the grip data.

7. The electronic device of claim 1, wherein the processor is to produce the classification based on orientation data, coordinate data, or speed data.

8. An apparatus, comprising:
a communication interface to receive tip pressure data from a stylus device;
a touchscreen controller to determine information comprising coordinate data, orientation data, or speed data corresponding to the stylus device; and
a processor to produce, during a prediction stage, a writing surface classification using a machine learning model based on the tip pressure data and the information, the writing surface classification including a value indicating a degree of roughness of the writing surface to control haptic feedback with an inverse relationship relative to the value indicating the degree of roughness of the writing surface, the machine learning model having weights tuned, during a training stage, to produce the writing surface classification, wherein the machine learning model is an artificial neural network.

9. The apparatus of claim 8, wherein the communication interface is to send the writing surface classification to the stylus device.

10. The apparatus of claim 8, wherein the machine learning model is a multilayer perceptron (MLP) model.

11. A non-transitory tangible computer-readable medium comprising instructions when executed cause a processor of an electronic device to:
receive tip pressure data captured by a tip pressure sensor, wherein the tip pressure data is captured while a stylus tip is in contact with a writing surface;
predict, during a prediction stage, using a machine learning model, a classification of the writing surface based on the tip pressure data, the classification of the writing surface including a value indicating a degree of roughness of the writing surface, the machine learning model having weights tuned, during a training stage, to produce the classification of the writing surface, wherein the machine learning model is an artificial neural network; and
send the classification to a haptic device to control haptic feedback with an inverse relationship relative to the value indicating the degree of roughness of the surface.

12. The non-transitory tangible computer-readable medium of claim 11, wherein the classification is sent to the haptic device via a wireless communication interface.

13. The non-transitory tangible computer-readable medium of claim 11, wherein the classification is sent to the haptic device via an internal bus.

\* \* \* \* \*